US012475823B2

(12) United States Patent
Lee et al.

(10) Patent No.: US 12,475,823 B2
(45) Date of Patent: Nov. 18, 2025

(54) DISPLAY DEVICE AND METHOD OF DISPLAYING IMAGE IN DISPLAY DEVICE

(71) Applicant: SAMSUNG DISPLAY CO., LTD., Yongin-si (KR)

(72) Inventors: Kang Hee Lee, Yongin-si (KR); Gil Bae Park, Yongin-si (KR); Seung Ho Park, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/392,081

(22) Filed: Dec. 21, 2023

(65) Prior Publication Data

US 2024/0119876 A1 Apr. 11, 2024

Related U.S. Application Data

(60) Division of application No. 17/817,706, filed on Aug. 5, 2022, now Pat. No. 11,887,517, which is a (Continued)

(30) Foreign Application Priority Data

Jul. 8, 2016 (KR) ........................ 10-2016-0087071

(51) Int. Cl.
*G09G 3/00* (2006.01)
*G09G 3/20* (2006.01)

(52) U.S. Cl.
CPC ........... *G09G 3/007* (2013.01); *G09G 3/2085* (2013.01); *G09G 3/2092* (2013.01); (Continued)

(58) Field of Classification Search
CPC .... G09G 3/007; G09G 3/2085; G09G 3/2092; G09G 2320/0233; G09G 2320/0257; (Continued)

(56) References Cited

U.S. PATENT DOCUMENTS

| | | | |
|---|---|---|---|
| 6,317,173 | B1 | 11/2001 | Jung et al. |
| 7,312,767 | B2 | 12/2007 | Weitbruch et al. |

(Continued)

FOREIGN PATENT DOCUMENTS

| | | |
|---|---|---|
| CN | 101017262 A | 8/2007 |
| CN | 101183518 | 5/2008 |

(Continued)

OTHER PUBLICATIONS

Office Action dated Apr. 28, 2022 in corresponding Chinese Patent Application No. 201710551216.3, 7 pages (in Chinese).

(Continued)

*Primary Examiner* — Roberto W Flores
(74) *Attorney, Agent, or Firm* — F. CHAU & ASSOCIATES, LLC

(57) ABSTRACT

A method of displaying an image in a display device may include determining the degree of deterioration of pixels included in a display unit based on image data of a current frame image, determining a shift route of the current frame image so as to correspond to the determined degree of deterioration. The first image data is corrected to second image data so that the current frame image is shifted along the shift route.

18 Claims, 9 Drawing Sheets

Related U.S. Application Data continuation of application No. 16/734,893, filed on Jan. 6, 2020, now Pat. No. 11,436,958, which is a continuation of application No. 15/622,788, filed on Jun. 14, 2017, now Pat. No. 10,529,267.

(52) U.S. Cl.
CPC ............... *G09G 2320/0233* (2013.01); *G09G 2320/0257* (2013.01); *G09G 2320/043* (2013.01); *G09G 2330/10* (2013.01); *G09G 2360/16* (2013.01)

(58) Field of Classification Search
CPC ......... G09G 2320/043; G09G 2330/10; G09G 2360/16; G09G 3/20
See application file for complete search history.

(56) References Cited

U.S. PATENT DOCUMENTS

| | | | |
|---|---|---|---|
| 7,432,931 | B2 | 10/2008 | Someya et al. |
| 7,889,165 | B2 | 2/2011 | Hwang |
| 8,610,704 | B2 | 12/2013 | Yun et al. |
| 8,692,821 | B2 | 4/2014 | Park |
| 9,135,848 | B2 | 9/2015 | Park et al. |
| 9,357,121 | B2 | 5/2016 | Hirose |
| 9,812,067 | B2 | 11/2017 | Yang et al. |
| 9,922,598 | B2 | 3/2018 | Park et al. |
| 10,146,091 | B2 | 12/2018 | Lim et al. |
| 10,529,267 | B2 | 1/2020 | Lee et al. |
| 11,436,958 | B2 | 9/2022 | Lee et al. |
| 2005/0093850 | A1 | 5/2005 | Mori et al. |
| 2005/0204313 | A1 | 9/2005 | Enoki et al. |
| 2006/0001601 | A1 | 1/2006 | Ono |
| 2007/0019007 | A1 | 1/2007 | Jung |
| 2007/0096767 | A1 | 5/2007 | Tsai |
| 2007/0109284 | A1 | 5/2007 | Yamazaki et al. |
| 2007/0146485 | A1 | 6/2007 | Horikoshi |
| 2007/0182914 | A1 | 8/2007 | Hwang |
| 2007/0192821 | A1 | 8/2007 | Suga |
| 2007/0222712 | A1 | 9/2007 | Chiaki et al. |
| 2007/0236410 | A1 | 10/2007 | Shimizu |
| 2008/0111886 | A1 | 5/2008 | Bai |
| 2009/0128707 | A1 | 5/2009 | Hattori et al. |
| 2010/0002133 | A1 | 1/2010 | Ueno et al. |
| 2011/0095974 | A1 | 4/2011 | Moriwaki |
| 2012/0099804 | A1 | 4/2012 | Aguilera et al. |
| 2014/0049566 | A1 | 2/2014 | Sudou |
| 2014/0198192 | A1 | 7/2014 | Yamamoto et al. |
| 2014/0232409 | A1 | 8/2014 | Keum |
| 2015/0009107 | A1 | 1/2015 | Park et al. |
| 2015/0077406 | A1 | 3/2015 | Lee et al. |
| 2016/0086526 | A1 | 3/2016 | Kim et al. |
| 2016/0189336 | A1 | 6/2016 | Lee et al. |
| 2016/0329008 | A1* | 11/2016 | Chun ....................... G09G 3/20 |
| 2018/0012530 | A1 | 1/2018 | Lee et al. |
| 2018/0012563 | A1 | 1/2018 | Lee et al. |
| 2020/0143725 | A1 | 5/2020 | Lee et al. |
| 2022/0375375 | A1 | 11/2022 | Lee et al. |

FOREIGN PATENT DOCUMENTS

| | | | |
|---|---|---|---|
| CN | 101647284 | A | 2/2010 |
| CN | 102333200 | | 1/2012 |
| CN | 102402940 | A | 4/2012 |
| CN | 102595022 | A | 7/2012 |
| CN | 103037192 | | 4/2013 |
| CN | 103595897 | A | 2/2014 |
| CN | 103765293 | | 4/2014 |
| CN | 103843318 | A | 6/2014 |
| CN | 105549283 | A | 5/2016 |
| CN | 105684066 | A | 6/2016 |
| CN | 105702212 | A | 6/2016 |
| CN | 105741776 | A | 7/2016 |
| CN | 1224887 | A | 1/2021 |
| JP | 2000-231364 | | 8/2000 |
| JP | 2001-034223 | | 2/2001 |
| JP | 2005-148558 | | 6/2005 |
| JP | 2008-039868 | | 2/2008 |
| JP | 2008-242079 | A2 | 10/2008 |
| JP | 2009-194420 | | 8/2009 |
| KR | 10-2004-0014590 | | 2/2004 |
| KR | 10-2005-0102132 | A | 10/2005 |
| KR | 10-2005-0105574 | | 11/2005 |
| KR | 10-2006-0042728 | | 5/2006 |
| KR | 10-2018-0006584 | | 1/2018 |
| WO | 2008128380 | A1 | 10/2008 |
| WO | 2013187021 | | 12/2013 |
| WO | 2015060533 | A1 | 4/2015 |

OTHER PUBLICATIONS

Office Action dated Dec. 19, 2024, in corresponding Chinese Patent Application No. 202211280730.2, 7 pages.

Jiang, You-yan et al., "Study on the Burn-In Effect of Plasma Display Panels", Chinese Journal of Electron Devices, vol. 28, No. 4, Dec. 2005.

* cited by examiner

DISPLAY DEVICE AND METHOD OF DISPLAYING IMAGE IN DISPLAY DEVICE

CROSS-REFERENCE TO RELATED APPLICATIONS

This application claims priority to and the benefit of U.S. patent application Ser. No. 15/622,788, filed on Jun. 14, 2017, U.S. patent application Ser. No. 16/734,893, filed on Jan. 6, 2020, U.S. patent application Ser. No. 17/817,706, filed on Aug. 5, 2022, as well as Korean Patent Application No. 10-2016-0087071, filed on Jul. 8, 2016, in the Korean Intellectual Property Office, the entire contents of which are incorporated by reference herein.

1. TECHNICAL FIELD

The present inventive concept relates to a display device, and a method of displaying an image in the display device.

2. DISCUSSION OF THE RELATED ART

There are various kinds of display devices, such as an organic light emitting diode (OLED) display device, a liquid crystal display (LCD) device, and a plasma display device that are in widespread use.

When display devices output specific images or characters for a long time, a performance of specific pixels may become degraded, thereby generating an after-image on the display.

Pixel shift technology has been developed to reduce the incidence of pixel degradation. More particularly, pixel shift technology operates by displaying an image that periodically shifts position after a predetermined period on a display panel. The periodic shifting of the image may reduce or prevent pixel deterioration associated with static images. When the display device shifts display of an image at a predetermined period and displays the shifted image on a display panel, the same data is prevented from being output by a specific pixel for a long time, which can reduce or prevent a specific pixel from being degraded (e.g. a deteriorated pixel performance).

For example, the display device may shift an image with the same pattern by utilizing the pixel shift technology. However, when the display device shifts the image by repeating the same pattern within a pixel region, the performance of the pixels may still deteriorate.

SUMMARY

The present inventive concept provides a display device that may prevent/reduce a pixel performance from being degraded by shifting an image by a pixel shift operation, and preventing the generation of an afterimage, and a method of displaying an image in the display device.

An exemplary embodiment of the present inventive concept provides a method of displaying an image in a display device, the method may include determining a degree of deterioration of pixels included in a display unit based on image data of a current frame image; determining a shift route to display the current frame image along a display area of the display unit in which the determined shift route has a path to disperse a pixel stress substantially corresponding to the degree of deterioration of the pixels; and shifting display of the current frame image along the determined shift route.

The shift route may include a plurality of shift routes along a display area of the display unit.

In an embodiment of the inventive concept, the plurality of shift routes may not overlap one another along a display area of the display unit.

The plurality of shift routes may include, for example, a first shift route that may extend from a substantially central display area of the display unit to a substantially outer peripheral display area of the display unit, and a second shift route extended from the substantially outer peripheral display area to the substantially central display area of the display unit.

An end point of the first shift route may be the same as a start point of the second shift route.

The shifting of the display of the current frame image may include shifting display of the current frame image along the first shift route, and then shifting display of the current frame image along the second shift route.

The determining of the shift route of the display of the current frame image may include determining the shift route so that the shift route includes a large amount of shifting when the degree of the deterioration of the pixels is relatively large.

The determining of the degree of the deterioration of the pixels may include: grouping the pixels into pixel blocks; generating a first accumulated stress map representing the degree of the deterioration of the pixels included in the pixel blocks based on the image data; and calculating a brightness difference between the adjacently disposed pixel blocks by analyzing the first accumulated stress map.

The generating of the first accumulated stress map may include calculating an average brightness value of each of the pixel blocks and generating a stress map of the current frame image including the average brightness value, and reading a second accumulated stress map of a previous frame image from a memory, and generating the first accumulated stress map by applying the generated stress map to the second accumulated stress map.

The calculating of the brightness difference may include determining that the degree of deterioration of the pixels is relatively large when the brightness difference is large.

The determining of the plurality of shift routes may include determining the shift route so that the shift route includes a larger number of shift routes than a reference number when the brightness difference is larger than a reference brightness difference.

Another exemplary embodiment of the present inventive concept includes a display device, including: a processor configured to generate image data to shift display of a current frame image along the plurality of shift routes; and a display unit configured to display the current frame image based on the image data.

The processor may include: an image data generator, which generates first image data of the current frame image; a shift range determiner, which determines the degree of the deterioration of the pixels based on the first image data, and determines the plurality of shift routes so as to correspond to the determined degree of deterioration of the pixels; and an image corrector, which corrects the first image data to second image data so that the current frame image is shifted along the shift route.

The processor may further include a stress calculating unit, which analyzes a brightness distribution of the current frame image based on the first image data and generates the stress map.

The shift range determiner may determine the plurality of shift routes so as to correspond to the brightness difference between the pixels by using the stress map.

The plurality of shift routes may include a first shift route extended from a substantially central display area of the display unit to a substantially outer peripheral display area of the display unit, and a second shift route, which does not overlap the first shift route and is extended from the substantially outer peripheral display area to the substantially central display area of the display unit.

Yet another exemplary embodiment of the present inventive concept includes a method of displaying an image in a display device, the method including: shifting, by a display area of the display device, an image displayed along a first shift route extending from a substantially central area to a substantially outer peripheral display area of the display device; and shifting display of the image along a second shift route, which does not overlap the first shift route, and the second shift route extends from the substantially outer peripheral display area to the substantially central display area of the display device, in which an end point of the first shift route is a start point of the second shift route.

According to the display device and the method of displaying an image in the display device of the present inventive concept, it may be possible to prevent or reduce a deteriorated performance of the pixels by shifting display of an image by a pixel shift operation, and shifting the display of the image may reduce or prevent a generation of an afterimage on the display area of the display unit.

Further, according to the display device and the method of displaying an image in the display device of the present inventive concept, by determining the degree of deterioration of the pixels and determining a shift route for display of an image so as to correspond to a result of the determination, adverse effects such as the display of an afterimage may be reduced or prevented by shifting the image according to the determined shift route.

BRIEF DESCRIPTION OF THE DRAWINGS

An embodiment of the present inventive concept will now be described more fully hereinafter with reference to the accompanying drawings. However, the inventive concept may be practiced in various forms and is not limited to the description set forth herein. Rather, the embodiment of the inventive concept is provided so that the inventive concept may be practiced by a person of ordinary skill in the art without undue experimentation.

In the drawing figures, dimensions may be exaggerated for clarity of illustration. It will be understood that when an element is referred to as being "between" two elements, the element may be between just the two elements, or there can be one or more intervening elements present. Like reference numerals refer to like elements throughout.

DETAILED DESCRIPTION

Figure 1:
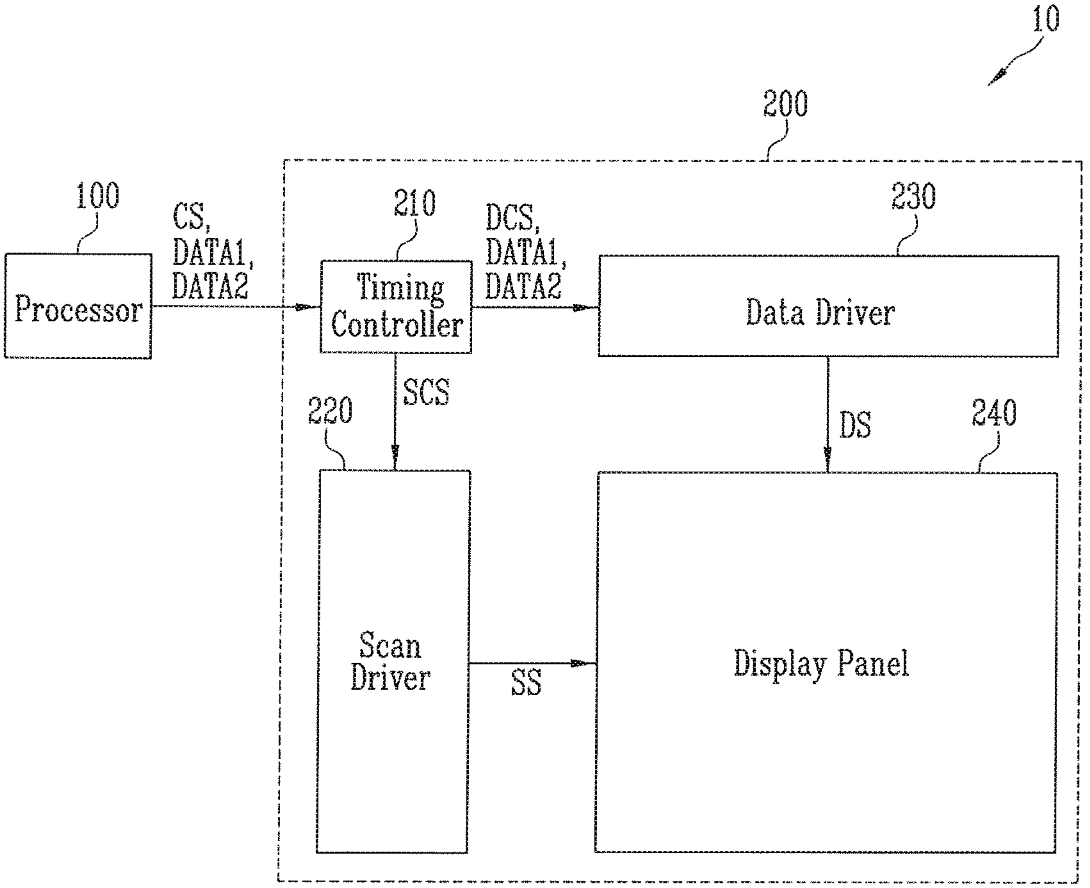
FIG. 1 is a schematic block diagram illustrating a display device according to an exemplary embodiment of the present inventive concept.

In the exemplary embodiments according to the present inventive concept disclosed in the present specification, a specific structural or functional description is simply illustrative for the purpose of explaining the exemplary embodiments according to the present inventive concept, and the exemplary embodiment according to the present inventive concept may be carried out in various forms. Thus, the present inventive concept is not limited to the exemplary embodiment described in the present specification and shown in the drawings.

Terms such as "first", "second", and the like may be used for describing various constituent elements and for discriminating between constituent elements, but the constituent elements should not be limited to the terms. For example, a first constituent element may be named as a second constituent element, and similarly a second constituent element may be named as a first constituent element.

Terms used in the present specification do not limit the present inventive concept. As used herein, singular forms of terms are intended to include the plural forms as well, unless the context clearly indicates otherwise. In the present specification, a person of ordinary skill in the art should be understand that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If they are not contrarily defined, all terms used herein including technological or scientific terms have the same meaning as those generally understood by a person of ordinary skill in the art. Terms defined in a dictionary should be interpreted to have the same meaning as would be understood by a person of ordinary skill in the art, but are not to be interpreted as having an ideally or excessively formal meaning if it is not clearly defined in this specification.

As used herein, an artisan should understand and appreciate that term "deterioration of a pixel" (e.g. "pixel deterioration", "deteriorated performance of a pixel") refers to a deterioration (or a potential deterioration) of the pixel performance that may result, for example, in an afterimage (image retention). Pixel deterioration can occur, for example, in OLEDs, plasma, and LCD displays, and can result from the pixels being charged at a certain level and/or for a prolonged period of time. For example, in an LCD panel, a parasitic charge (polarization) may build up within pixels and sub-pixels at the liquid crystal level that affects the optical properties of the LCD, and may inhibit the alignment of the crystals, which in turn may inhibit the crystals from returning to a fully normal state when deactivated.

Hereinafter, exemplary embodiments of the present inventive concept will be described in detail with reference to the accompanying drawings.

Figure 2:
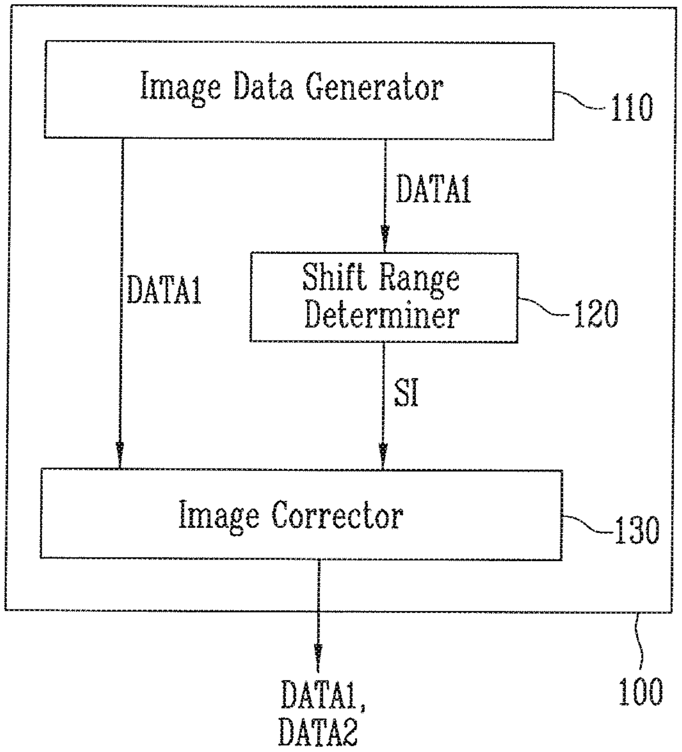
FIG. 2 is a schematic block diagram of a processor illustrated in FIG. 1.

FIG. 1 is a schematic block diagram illustrating a display device according to an exemplary embodiment of the present inventive concept, and FIG. 2 is a schematic block diagram of a processor such as illustrated in FIG. 1.

Referring to FIGS. 1 and 2, a display device 10 according to an exemplary embodiment of the present inventive concept may include a processor 100 and a display unit 200.

The processor 100 may supply a first image data DATA1, a second image data DATA2, and a control signal CS to the display unit 200. For example, the processor 100 may be implemented by an Application Processor (AP), a mobile AP, a Central Processing Unit (CPU), a Graphic Processing Unit (GPU), or a processor, which is capable of controlling an operation of the display unit 200, but is not limited thereto. The processor may be realized as a single chip. However, it is within the spirit and scope of the inventive concept that more than one processor may be used, with certain tasks performed by respective processors.

With reference to FIG. 2, the processor 100 may include an image data generator 110, a shift range determiner 120, and an image corrector 130.

The image data generator 110 may be configured to generate the first image data DATA1 for displaying, by the display unit 200, a current frame image. The image data generator 110 may provide the generated first image data DATA1 to the shift range determiner 120 and the image corrector 130 for additional actions.

For example, the shift range determiner 120 may determine the degree of the deterioration of the pixels included in the display unit 200 based on the first image data DATA1 of the current frame image.

For example, the shift range determiner 120 may determine the degree of the deterioration of the pixels by analyzing a brightness distribution of the current frame image based on the first image data DATA1. When a specific pixel from among the pixels included in the display unit 200 receives image data having a higher brightness value than the brightness values of the peripheral pixels, the specific pixel may be determined to have a higher (increased) possibility of a deteriorated pixel performance than those of the peripheral pixels. Thus, the pixel shifting may be performed in anticipation of pixel deterioration that may adversely impact pixel performance.

The shift range determiner 120 may determine a shift route of the display of the current frame image to correspond to the determined degree of the deteriorated pixel performance. For example, the shift range determiner 120 may detect specific pixels, of which brightness differences from those of the peripheral pixels are larger than a reference brightness difference, by analyzing the brightness distribution of the current frame image based on the first image data DATA1, and determine a shift route for display of the current frame image that may prevent the performance of specific pixels from deteriorating.

More particularly, the first image data signal (DATA1) is output to the display panel for display of a current frame image that is stationary (e.g. unshifted). However, in response to determining that at least some of the pixels that display the current frame image have an increased probability of generating an afterimage (based on brightness values of the pixels according to an index in a pixel stress map), the processor outputs a second image data signal that includes shift information to shift a display of the current frame image along a shift route of the display panel. The shifting of the display of the image along a shift route to disperse the pixel stress may reduce or prevent the generation of an afterimage displayed by the overly-stressed pixels.

The shift route of the current frame image may include a plurality of routes formed along the display panel 240.

According to an exemplary embodiment of the present inventive concept, the plurality of routes included in the shift route of the current frame image may be formed so as not to overlap one another.

The shift range determiner 120 may provide shift range information SI including the determined shift route to the image corrector 140.

The image corrector 130 may supply the first image data DATA1 or the second image data DATA2 to the display unit 200 based on the shift range information SI provided by the shift range determiner 120.

When the shift range information SI contains the shift route of the display of the current frame image, the image corrector 130 may correct (e.g. change) the first image data DATA1 to the second image data DATA2 and supply the second image data DATA2 to the display unit 200 so that the display of the current frame image is shifted along the shift route.

However, when the shift range information SI contains information indicating not to shift the current frame image (e.g. when pixel brightness is uniformly distributed among the pixels, or a degree of deteriorated performance may not warrant pixel shifting), the image corrector 130 may supply the first image data DATA1 to the display unit 200 so that the display of the current frame image is not shifted by the display unit 10.

The display unit 200 may include, for example, a timing controller 210, a scan driver 220, a data driver 230, and a display panel 240.

The timing controller 210 may receive any one of the first image data DATA1 and the second image data DATA2 from the processor 100.

Further, the timing controller 210 may receive the control signal CS from the processor 100, and may generate a scan control signal SCS and a data control signal DCS by using the received control signal CS.

The timing controller 210 may transmit the scan control signal SCS to the scan driver 220. Moreover, the timing controller 210 may transmit the data control signal DCS to the data driver 230.

The data driver 230 may receive any one of the first image data DATA1 and the second image data DATA2 from the timing controller 210 and the data control signal DCS, and generate a data signal DS.

For example, the data driver 230 may generate the data signal DS based on the first image data DATA1, or generate the data signal DS based on the second image data DATA2. The data driver 230 may transmit the generated data signal DS to data lines (not illustrated).

According to an exemplary embodiment of the inventive concept, the data driver 230 may be directly mounted in the display panel 240.

The scan driver 220 may supply a scan signal SS to scan lines (not illustrated) based on the scan control signal SCS.

According to an exemplary embodiment of the inventive concept, the scan driver 220 may be directly mounted in the display panel 240.

The display panel 240 may include the pixels, which are connected to the scan lines and the data lines, to display images.

For example, the display panel 240 may be implemented by an organic light emitting display panel, a liquid crystal display panel, a plasma display panel, to name some non-limiting possible constructions.

The pixels may be selected in a unit of a horizontal line when the scan signal SS is supplied to the scan lines. The pixels selected by the scan signal SS may receive the data signal DS from the data lines connected with the pixels. The pixels receiving the data signal DS may emit light of predetermined brightness in response to receiving the data signal DS.

According to an exemplary embodiment of the present inventive concept, the data driver 230 and the scan driver 220 are shown in FIG. 1 as being separately positioned in the display device unit 200, but the data driver and the scan driver may be combined and positioned in the display unit 200.

Figure 3:
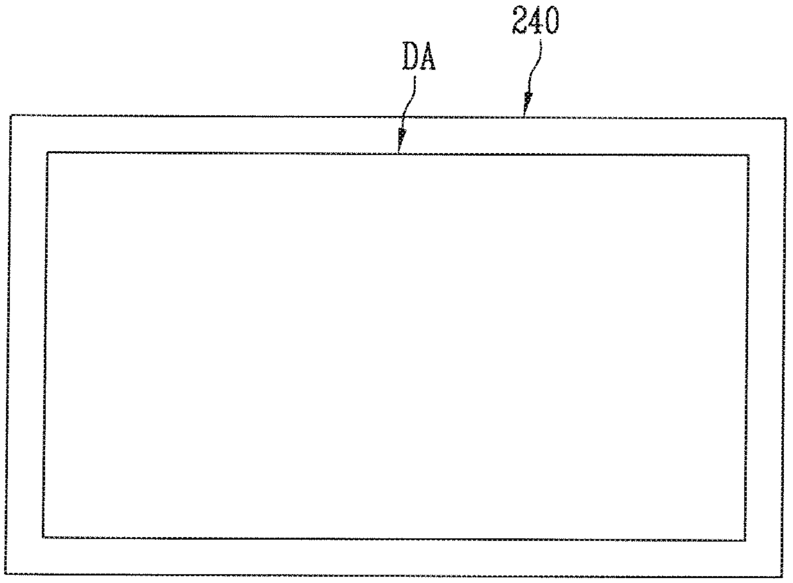
FIG. 3 is a conceptual diagram illustrating an image display area of a display panel illustrated in FIG. 1.
Figure 4A:
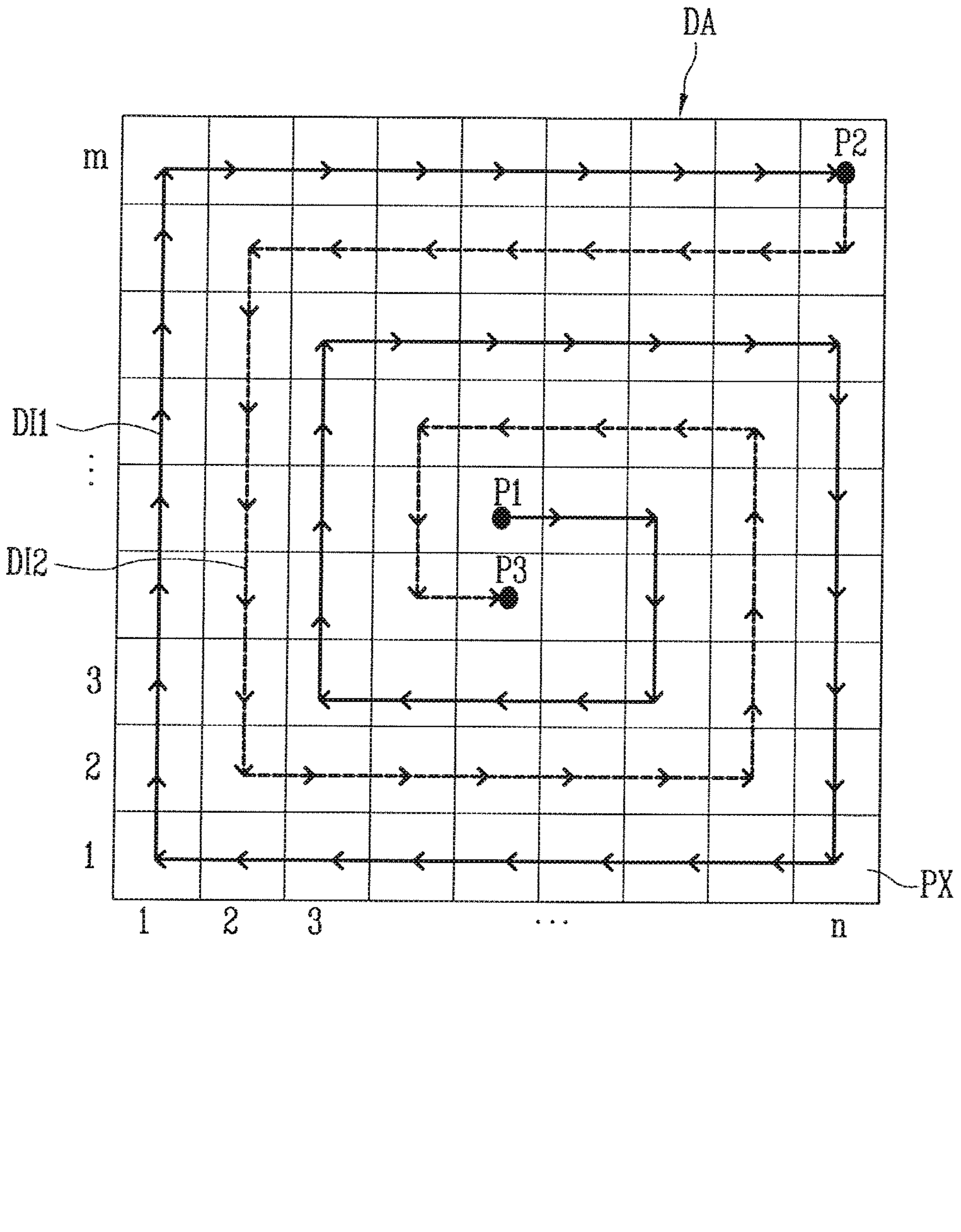
FIGS. 4A and 4B are conceptual diagrams illustrating a method of determining a plurality of shift routes for a current frame image by an image range determiner according to an exemplary embodiment of the present inventive concept.
Figure 4B:
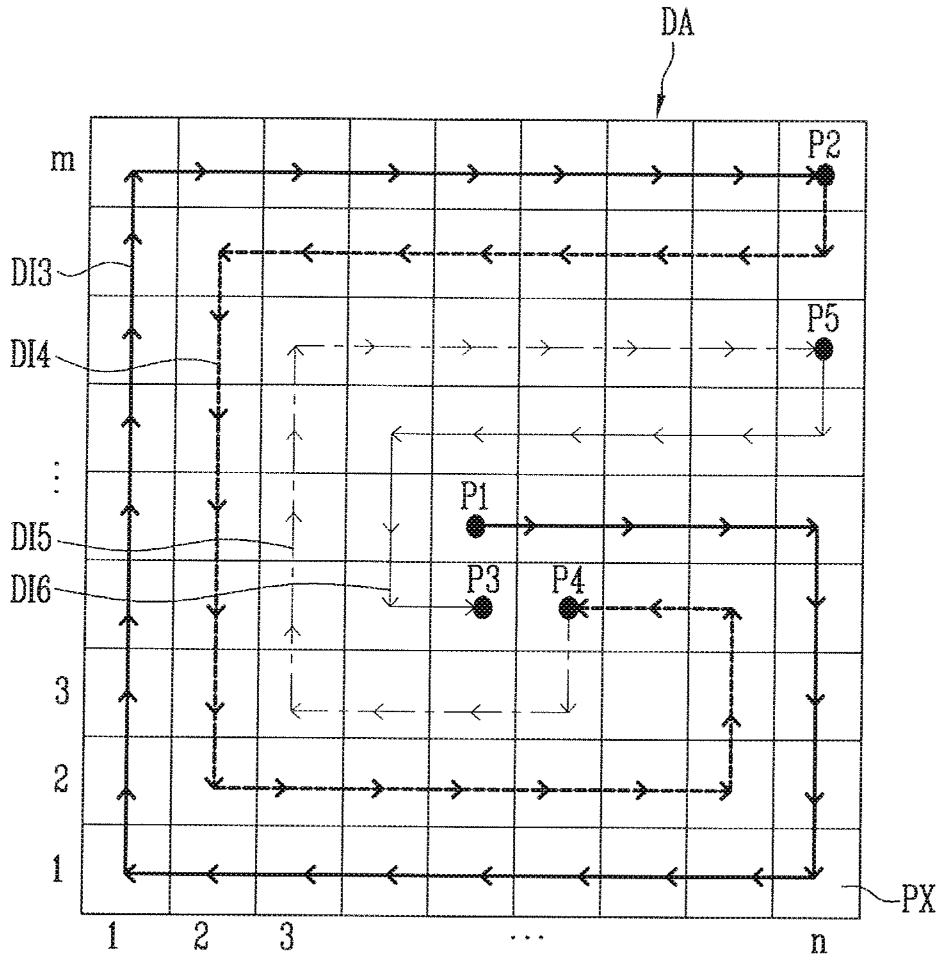

FIG. 3 is a conceptual diagram illustrating an image display area of a display panel illustrated in FIG. 1, and FIGS. 4A and 4B are conceptual diagrams illustrating a method of determining a plurality of shift routes for a current frame image by an image range determiner according to a first exemplary embodiment of the present inventive concept.

Referring to FIG. 3, the display panel 240 may include, for example, an image display area DA, which is capable of displaying an image. A user of the display panel 240 may view an image displayed on the image display area DA.

The image display area DA of the display panel 240 may include a plurality of pixels which emit light with brightness corresponding to the data signal DS.

The shift range determiner 120 may determine the degree of deteriorated performance of the pixels included in the display unit, and determine a shift route of display of the current frame image that may correspond to the degree of deteriorated performance of the pixels. Detailed contents thereof will be described now with reference to FIGS. 4A and 4B.

FIG. 4A illustrates a shift route of a current frame image formed along the image display area DA. Here, the image display area DA may include pixels PX in an m×n matrix structure. For example, when a resolution of the display panel 240 is 1920×1080, n may be 1,920, and m may be 1,080.

The shift route of the current frame image may include, for example, a first route DI1 extended from a first point P1 to a second point P2, and a second route DI2 extended from the second point P2 to a third point P3. As shown in FIG. 4A, the first point P1 and the third point P3 may be positioned in a substantially central area of the image display area DA, and the second point P2 may be positioned in a substantially outer peripheral display area of the image display area DA of the display panel 240. Further, the first route DI1 and the second route DI2 may not overlap each other, and each of the first route DI1 and the second route DI2 may be formed in a maze form surrounding each other.

In this embodiment of the inventive concept, the first route DI1 starts at a substantially central display area P1 of the display unit, and prior to reaching the endpoint P2, has a path around a substantially outer peripheral display area surrounding most of the path of the second route DI2. However, a person of ordinary skill in the art should understand and appreciate that various arrangements of pixel shift routes in addition to the examples shown herein are within the scope of the inventive concept.

The image corrector 130 of processor 100 may correct (e.g. change) the first image data DATA1 to the second image data DATA2 so that the display of the current frame image is shiftable along the first route DI1, and/or the second route DI2 based on the shift range information SI provided from the shift range determiner 120 (e.g. as shown in FIG. 2).

In this example, the display unit 200 may display the current frame image shifted in a direction of an arrow, for example, as shown in FIG. 4A, whenever receiving the second image data DATA2 from the processor 100.

For example, when it is assumed that the center of the current frame image is displayed at the first point P1, the display unit 200 may shift the display of the center of the current frame image to the second point P2 along the first route DI1 whenever receiving the second image data DATA2 and display the current frame image. Further, when the center of the current frame image is shifted to be displayed at the second point P2, the display unit 200 may shift the center of the current frame image being displayed to the third point P3 along the second route DI2 and display the current frame image. As described above, the display unit 200 may shift the current frame image along the first route DI1 and the second route DI2 and display the current frame image along a shifted route whenever receiving the second image data DATA2 from the image corrector 130.

Referring to FIG. 4B, the shift range determiner 120 may determine a new shift route different from the shift route illustrated in FIG. 4A.

For example, the shift route of the current frame image may include a third route DI3 extended from the first point P1 to the second point P2, a fourth route DI4 extended from the second point P2 to a fourth point P4, a fifth route DI5 extended from the fourth point P4 to a fifth point P5, and a sixth route DI6 extended from the fifth point P5 to the third point P3.

In FIG. 4B, the first point P1, the third point P3, and the fourth point P4 may be positioned in the center area (e.g. a substantially central area) of the image display area DA, and the second point P2 and the fifth point P5 may be positioned in an outer peripheral area (e.g. a substantially outer peripheral area) of the image display area DA. Further, the third route DI3 to the sixth route DI6 may not overlap one another, and each of the third route DI3 to the sixth route DI6 may be formed in a maze form surrounding one another.

The image corrector 130 may correct (e.g. change display information) of the first image data DATA1 to the second image data DATA2 so that the display of the current frame image is shiftable along the third route DI3 to the sixth route DI6 by using the shift range information SI provided from the shift range determiner 120.

In this example, the display unit 200 may display the image shifted in a direction of an arrow whenever receiving the second image data DATA2 from the processor 100.

For example, when it is assumed that the center of the current frame image is displayed at the first point P1, the display unit 200 may shift display of the center of the current frame image to the second point P2 along the third route DI3 whenever receiving the second image data DATA2, and then shift the display of the center of the current frame image to the fourth point P4 along the fourth route DI4, shift display of the center of the current frame image to the fifth point P5 along the fifth route DI5, and shift display of the center of the current frame image to the third point P3 along the sixth route DI6, and display the current frame image.

As described above, the display unit 200 may shift the display of the current frame image along the third route DI3 to the sixth route DI6 and display the current frame image whenever receiving the second image data DATA2.

A shift distance of the current frame image will be described with reference to FIGS. 4A and 4B. It can be seen when comparing FIGS. 4A and 4B that a distance of the shift of the current frame image from the first point P1 to the second point P2 along the third route DI3 is shorter than a distance of the shift of the current frame image along the first route DI1.

When the current frame image is shifted along the third route DI3, the center of the current frame image may be more rapidly shifted to the outer peripheral area of the image display area DA (e.g. a substantially outer peripheral area), compared to a case where the current frame image is shifted along the first route DI1.

For example, when a deteriorated performance (or a potential deteriorated performance) of the pixels PX disposed in the center area of the image display area DA based on a comparison of brightness values is relatively large, the current frame image may be shifted along the third route DI3, and a stress of the pixels PX disposed in the center area of the display may be more rapidly dispersed to the pixels PX disposed in the substantially outer peripheral area, compared to the case where the current frame image is shifted along the first route DI1.

Accordingly, the shift range determiner 120 may determine the degree of the deteriorated performance of the pixels PX, and determine a shift route, which includes a relatively longer shift route when the degree of deterioration (or potential deterioration) is relatively large, as a shift route of the current frame image.

Figure 5:
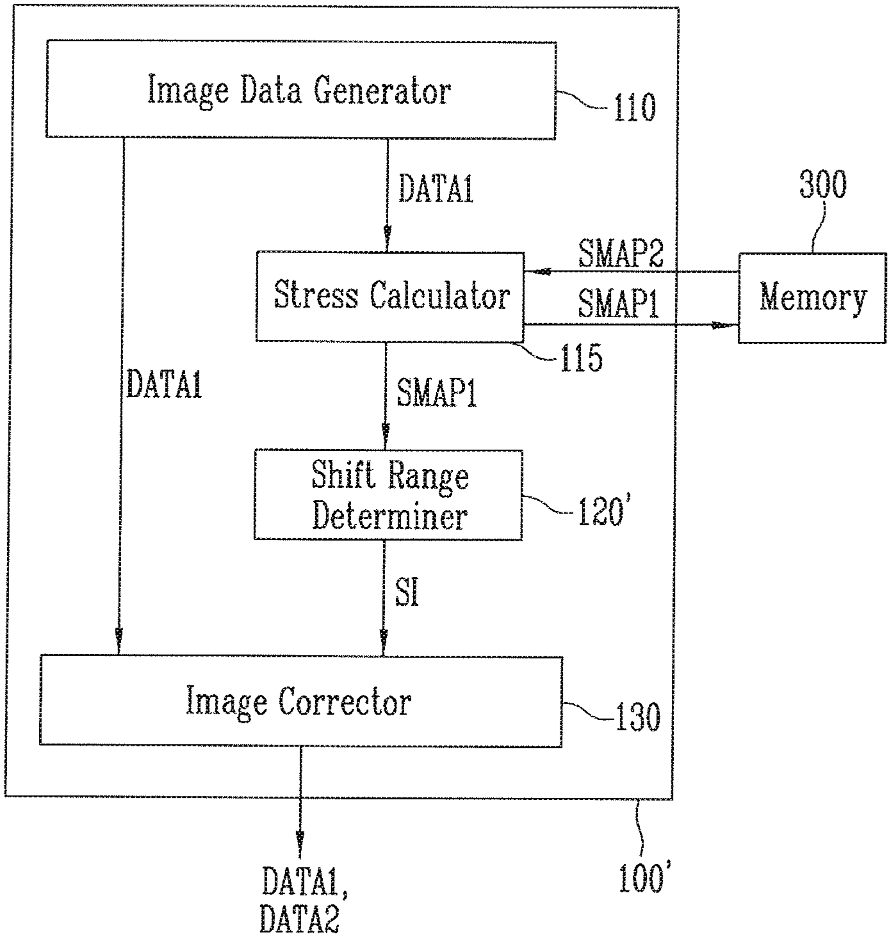
FIG. 5 is a schematic block diagram of a processor according to an exemplary embodiment of the present inventive concept.

FIG. 5 is a schematic block diagram of a processor according to a second exemplary embodiment of the present inventive concept.

A processor 100' according to an exemplary embodiment of the present inventive concept illustrated in FIG. 5 will be described based on a different point from that of the processor 100 according to an exemplary embodiment of the present inventive concept illustrated in FIG. 2. Parts, which are not specially described with reference to FIG. 5, will follow those of the processor 100 according to the aforementioned exemplary embodiment, and the same reference numeral refers to the same element, and the similar reference numeral refers to the similar element.

Referring to FIG. 5, the processor 100' may include, for example, an image data generator 110, a stress calculating unit 115, a shift range determiner 120', and an image corrector 130.

The image data generator 110 may generate first image data DATA1 for displaying, by the display unit 200, a current frame image. The image data generator 110 may provide the first image data DATA1 to the image corrector 140.

The stress calculating unit 115 may analyze a brightness distribution of the current frame image based on the first image data DATA1, and generate a stress map.

Particularly, the stress calculating unit 115 may be configured to group pixels PX included in the display unit 200 into pixel blocks, calculate an average brightness value of each of the pixel blocks, and generate a stress map. Here, the stress map may be an index representing the degree of deteriorated performance of the pixels PX included in the pixel blocks displaying the current frame image.

The stress calculating unit 115 may generate a stress map based on the first image data DATA1 of the current frame image, and may also generate a first accumulated stress map SMAP1 by using a second accumulated stress map SMAP2 of a previous frame image read from a memory 300. Here, the first accumulated stress map SMAP1 represents the degree of deterioration (or potential deterioration) of the performance of pixels PX included in the pixel blocks displaying the current frame image as an accumulated index, and may be generated by applying the stress map of the current frame image to the second accumulated stress map SMAP2 of the previous frame image.

For example, the stress calculating unit 115 may be configured to generate the first accumulated stress map SMAP1 by applying an average brightness value of the current frame image to an accumulated average brightness value of the previous frame image.

The stress calculating unit 115 may supply the first accumulated stress map SMAP1 to the shift range determiner 120'.

The shift range determiner 120' may be configured to determine whether the stress to the pixels should be dispersed via pixel shifting and a particular shifting route based on analyzing the first accumulated stress map SMAP1, and determine a shift route of the current frame image based on a result of the determination. The shift range determiner 120' may provide the shift range information SI including the determined shift route to the image corrector 130.

Figure 6:
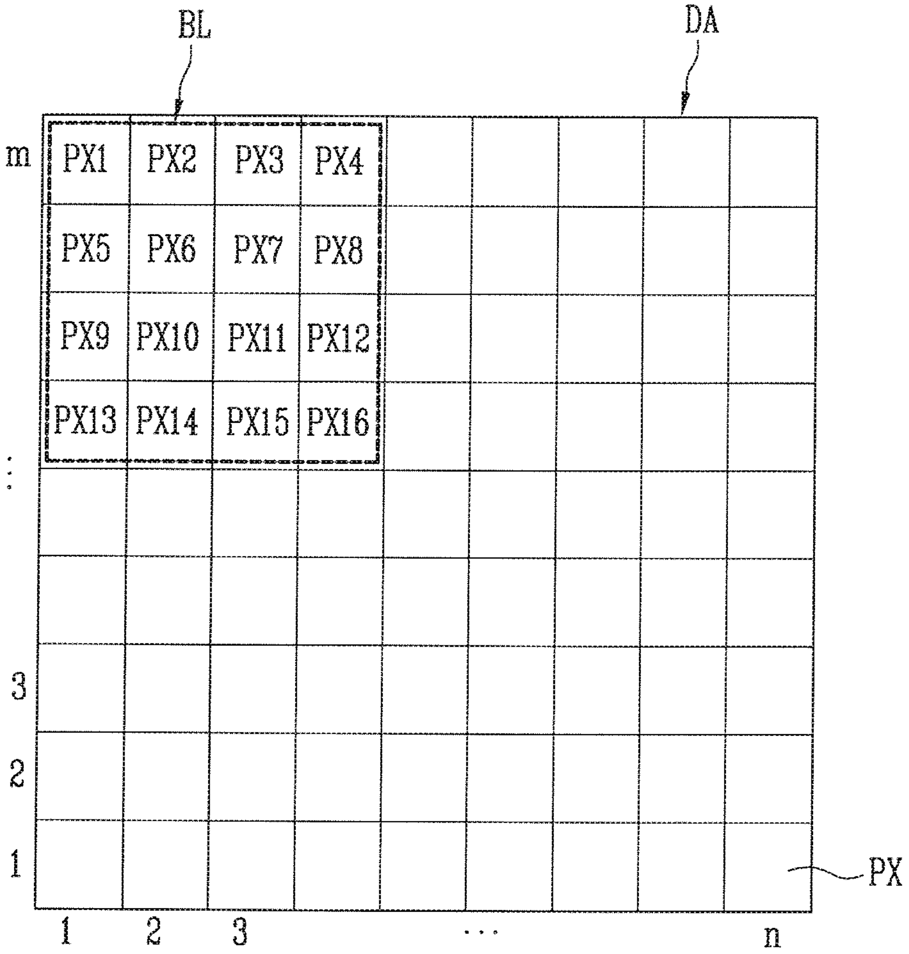
FIG. 6 is a conceptual diagram illustrating a method of grouping pixels into pixel groups by the processor according to the exemplary embodiment of the present inventive concept.

FIG. 6 is a conceptual diagram illustrating a method of grouping the pixels into pixel groups by the processor according to an exemplary embodiment of the present inventive concept.

Referring to FIG. 6, the stress calculating unit 115 may group the pixels PX included in the image display area DA into a plurality of pixel blocks BL. The pixels PX included in each of the pixel block BL may be disposed to be adjacent to one another.

According to an exemplary embodiment, the stress calculating unit 115 may group the pixels PX in the pixel blocks BL into a p×q matrix structure (herein, p and q are natural numbers).

For example, the stress calculating unit 115 may group the pixels PX1 to PX16 in a 4×4 matrix structure into one pixel block BL, and may also group the remaining pixels PX into the pixel blocks BL including the pixels PX in the 4×4 matrix structure.

Figure 7:
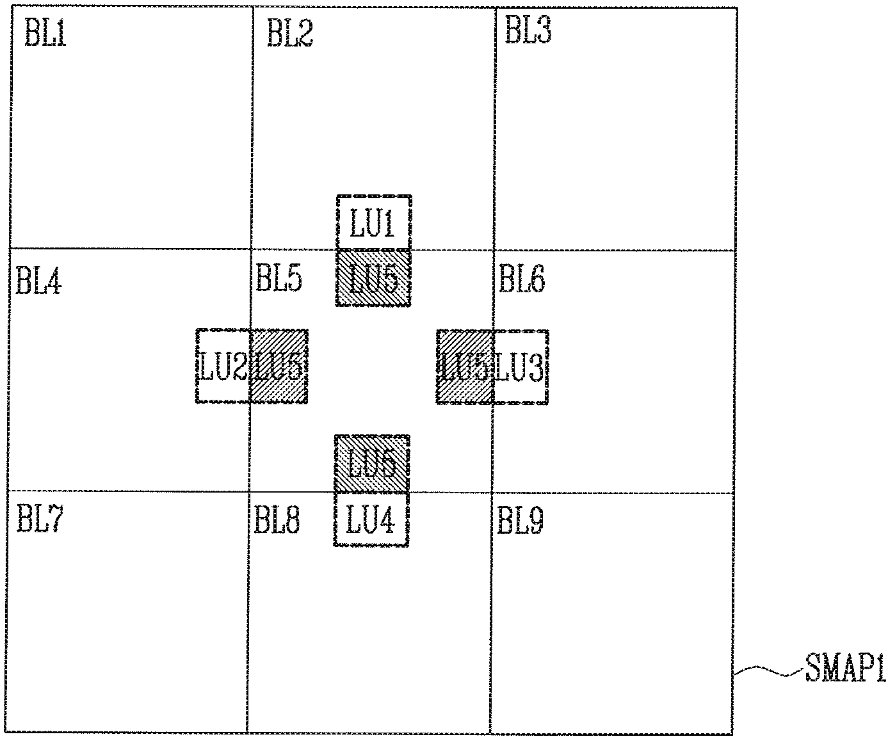
FIG. 7 is a conceptual diagram illustrating operation of a method of generating a first accumulated stress map by the processor according to the exemplary embodiment of the present inventive concept.

FIG. 7 is a conceptual diagram illustrating a method of generating the first accumulated stress map by the processor according to an exemplary embodiment of the present inventive concept.

Referring to FIG. 7, the stress calculating unit 115 may average brightness values of the pixels PX included in each of the pixel blocks BL and calculate an average brightness value for the current frame image, and generate a stress map of the current frame image including the average brightness value of each pixel block BL. For example, the stress map may include a set of brightness values, with which the plurality of pixel blocks BL emit light, respectively, may display the current frame image.

Further, the stress calculating unit 115 may calculate an average brightness value for each of the plurality of pixel blocks BL for every frame image, and average the calculated average brightness value for every frame image again and calculate an accumulated average brightness value for each of the plurality of pixel blocks BL. For example, the second accumulated stress map SMAP2 may include a set of accumulated average brightness values, with which the pixel blocks BL emit light from an initial frame image to a previous frame image, respectively.

The stress calculating unit 115 may store the second accumulated stress map SMAP2 in the memory 300, and read the second accumulated stress map SMAP2 from the memory 300 for generating the first accumulated stress map SMAP1.

The stress calculating unit 115 may generate the first accumulated stress map SMAP1 by applying the stress map to the second accumulated stress map SMAP2. For example, the stress calculating unit 115 may calculate accumulated average brightness values, with which the plurality of pixel blocks BL have emitted light from the initial frame image to the current frame image, respectively, and generate the first accumulated stress map SMAP1.

The shift range determiner 120' may determine whether to disperse the stress of the pixels displaying an image based on analyzing the first accumulated stress map SMAP1.

According to an exemplary embodiment, the shift range determiner 120' calculate a first brightness difference between the adjacent rows among the pixel blocks BL, and a second brightness difference between the adjacent columns among the pixel blocks BL, and when at least one of the first brightness difference and the second brightness difference is larger than a reference brightness difference, the shift range determiner 120' may determine that the deterioration of the pixels PX included in the pixel block BL may be addressed with pixel shifting.

For example, the shift range determiner 120' may compare an accumulated brightness average value of the pixel blocks. For example, the shift range determiner 120' may compare an accumulated brightness average value LU5 of the fifth pixel block BL5 and an accumulated brightness average value LU1 of the second pixel block BL2, and compare the accumulated brightness average value LU5 of the fifth pixel block BL5 and an accumulated brightness average value LU4 of the eighth pixel block BL8 to calculate the first brightness difference. Further, the shift range determiner 120' may compare the accumulated brightness average value LU5 of the fifth pixel block BL5 and an accumulated brightness average value LU2 of the fourth pixel block BL4, and compare the accumulated brightness average value LU5 of the fifth pixel block BL5 and an accumulated brightness average value LU3 of the sixth pixel block BL6 to calculate the second brightness difference. When any one of the first brightness difference and the second brightness difference is larger than the reference brightness difference, the shift range determiner 120' may determine that the deterioration (or potential deterioration) of the pixels PX included in the fifth pixel block is relatively large.

The shift range determiner 120' may determine a shift route of the current frame image based on the determined degree of deterioration. The shift range determiner 120' may set a shift route, which includes the large number of routes as corresponding to the degree of pixel deterioration, as the shift route of the current frame image.

For example, when a brightness difference between the adjacently disposed pixel blocks BL is smaller than the reference brightness difference, the shift range determiner 120' may determine a shift route including the first route DI1 and the second route DI2 illustrated in FIG. 4A as the shift route of the current frame image, and when the brightness difference between the adjacently disposed pixel blocks BL is larger than the reference brightness difference, the shift range determiner 120' may determine a shift route including the third route DI3 to the sixth route DI6 illustrated in FIG. 4B as the shift route of the current frame image.

Figure 8:
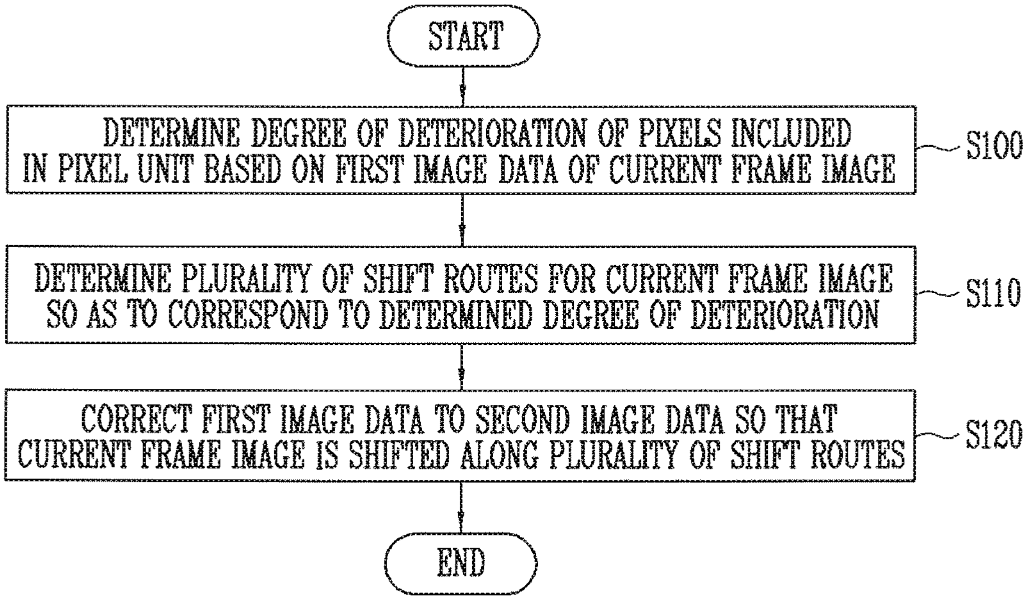
FIG. 8 is a flowchart illustrating operation of a method of displaying an image by a display device according to an exemplary embodiment of the present inventive concept.

FIG. 8 is a flowchart illustrating a method of displaying an image by a display device according to an exemplary embodiment of the present inventive concept.

Referring to FIG. 8, the shift range determiner 120 may determine the degree of deterioration of the pixels PX included in the display unit 200 based on first image data DATA1 of a current frame image (S100), and determine a shift route of the current frame image so as to correspond to the determined degree of deterioration (S110) of the pixels. In this case, the shift route may include a plurality of routes and, for example, difference in a length of the shift routes may result in different amounts of pixel stress being dispersed. Thus, a shift route may be determined in view of the determined degree of deterioration.

The image corrector 130 may correct the first image data DATA1 to second image data DATA2 so that the current frame image is shifted along the shift route (S120).

The display unit 200 may display the current frame image shifted along the shift route by using the second image data DATA2.

Figure 9:
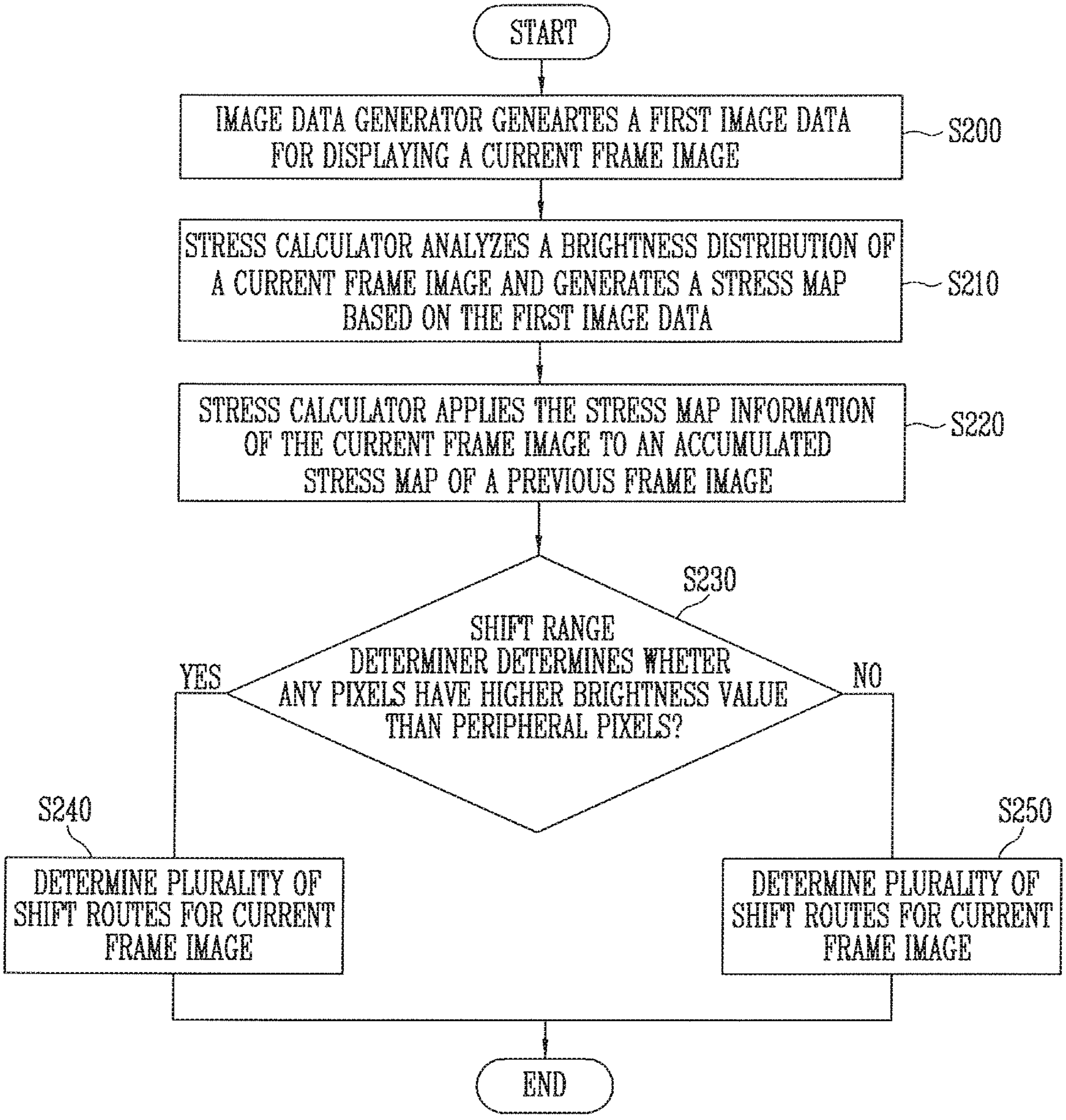
FIG. 9 is a flowchart illustrating operation of a display device in which the shift range determiner analyzes whether or not to shift display of a data image according to an embodiment of the inventive concept.

FIG. 9 is a flowchart illustrating operation of a display device in which the shift range determiner analyzes whether or not to shift display of a data image according to an embodiment of the inventive concept.

The image data generator 110 of the processor 100' generates a first image data DATA1 for displaying a current frame image (S200).

A stress calculator 115 of the processor 100' is configured to analyze a brightness distribution of a current frame image and generate a stress map based on the first image data DATA1 (S210).

The stress calculator 115 applies stress map information of the current frame image to an accumulated stress map of a previous frame image (S220).

The shift range determiner 120' determines whether any pixels have higher brightness values than peripheral pixels based on the stress map information (S230).

If there are pixels with a higher brightness value than peripheral pixels, there is an increased possibility of pixel deterioration, and the shift range determiner 120' sends a shift range information SI to shift the display of the image. The image corrector 130 may correct the first image data DATA1 to a second image data DATA2 and send the second image data DATA2 to the timing controller 210 to generate data signals DS corresponding to the second image data DATA2 (S240).

However, if the shift range determiner 120' determines that there are no pixels with a higher brightness value than peripheral pixels, the shift range determiner 120' sends shift range information SI to the image corrector 130 indicting that no shift of the image is to be performed. The image corrector 130 may then send the first image data DATA1 to the timing controller 210 to generate data signals DS corresponding to the first image data DATA1 (S250).

The present disclosure has been described with reference to the exemplary embodiment illustrated in the drawings, but the exemplary embodiment is only illustrative, and it would be appreciated by those skilled in the art that various modifications to the embodiments of the inventive concept may practiced.

What is claimed is:

1. A method of displaying an image in a display device, the method comprising:

shifting a center of an image from a first pixel in a first direction, according to a first shift route;

shifting the center of the image in a second direction perpendicular to the first direction, according to a second shift route;

shifting the center of the image in a third direction opposite to the first direction, according to a third shift route;

shifting the center of the image in a fourth direction opposite to the second direction, according to a fourth shift route, wherein the center of the image is repeatedly shifted in a first shift route pattern sequentially including the first shift route, the second shift route, the third shift route, and the fourth shift route, until the center of the image is arrived at a second pixel, and wherein lengths of each of the first shift route, the second shift route, the third shift route, and the fourth shift route are an even number of pixels;

shifting the center of the image from the second pixel in a fifth direction, according to a fifth shift route;

shifting the center of the image in a sixth direction perpendicular to the fifth direction, according to a sixth shift route;

shifting the center of the image in the fifth direction, according to a seventh shift route;

shifting the center of the image in a seventh direction opposite to the sixth direction, according to an eighth shift route;

shifting the center of the image in an eighth direction opposite to the fifth direction, according to a ninth shift route; and shifting the center of the image in the sixth direction, according to a tenth shift route, wherein, after the fifth shift route and the sixth shift route, the center of the image is repeatedly shifted in a second shift route pattern sequentially including the seventh shift route, the eighth shift route, the ninth shift route, and the tenth shift route, until the center of the image is arrived at a third pixel.

2. The method of claim 1, wherein the length of the second shift route is two pixels less than the length of the fourth shift route.

3. The method of claim 1, wherein no pixel exists between the first pixel and the third pixel.

4. The method of claim 3, wherein the first pixel and the third pixel are positioned in a center area of a display area of the display device.

5. The method of claim 4, wherein the first shift route and the second shift route have a same number of pixels.

6. The method of claim 5, wherein the third shift route and the fourth shift route have a same number of pixels.

7. The method of claim 6, wherein the first shift route in a next iteration of the first shift route pattern has a greater number of pixels than the first shift route in a previous iteration of the first shift route pattern.

8. The method of claim 1, wherein shift routes corresponding to a same direction do not overlap each other.

9. The method of claim 1, further comprising:

determining a degree of deterioration of pixels based on image data of the image; and determining a shift route to display the image along a display area of the display device in which the determined shift route has a path to disperse a pixel stress substantially corresponding to the degree of deterioration of the pixels.

10. A method of displaying an image in a display device, the method comprising:

shifting a center of an image from a first pixel in a first direction, according to a first shift route;

shifting the center of the image in a second direction perpendicular to the first direction, according to a second shift route;

shifting the center of the image in a third direction opposite to the first direction, according to a third shift route; and shifting the center of the image in a fourth direction opposite to the second direction, according to a fourth shift route, wherein the center of the image is repeatedly shifted in a first shift route pattern sequentially including the first shift route, the second shift route, the third shift route, and the fourth shift route, until the center of the image is arrived at a second pixel, and wherein the center of the image is shifted in a second shift route pattern from the second pixel to a third pixel immediately adjacent to the first pixel, wherein the second shift route pattern is surrounded by the first shift route pattern and the second shift route pattern does not overlap the first shift route pattern.

11. The method of claim 10, wherein no pixel exists between the first pixel and the third pixel.

12. The method of claim 11, wherein the first pixel and the third pixel are positioned in a center area of a display area of the display device.

13. The method of claim 10, wherein shift routes corresponding to a same direction do not overlap each other.

14. The method of claim 10, the first shift route and the second shift route do not overlap.

15. A method of displaying an image in a display device, the method comprising:

shifting a center of an image from a first pixel in a first direction, according to a first shift route;

shifting the center of the image two pixels in a second direction perpendicular to the first direction, according to a second shift route;

shifting the center of the image in a third direction opposite to the first direction, according to a third shift route; and shifting the center of the image four pixels in a fourth direction opposite to the second direction, according to a fourth shift route, wherein the center of the image is repeatedly shifted in a first shift route pattern sequentially including the first shift route, the second shift route, the third shift route, and the fourth shift route, wherein a length of the shift routes of the first shift route pattern increases by two pixels every two shift routes, until the center of the image is arrived at a second pixel, and wherein the center of the image is shifted in a second shift route pattern from the second pixel to a third pixel immediately adjacent to the first pixel, wherein the second shift route pattern is surrounded by the first shift route pattern and the second shift route pattern does not overlap the first shift route pattern.

16. The method of claim 15, wherein no pixel exists between the first pixel and the third pixel.

17. The method of claim 16, wherein the first pixel and the third pixel are positioned in a center area of a display area of the display device.

18. The method of claim 15, wherein shift routes corresponding to a same direction do not overlap each other.

* * * * *